G. W. CARPENTER.
THRESHER.
APPLICATION FILED APR. 8, 1914.
1,112,194.
Patented Sept. 29, 1914.
3 SHEETS—SHEET 3.
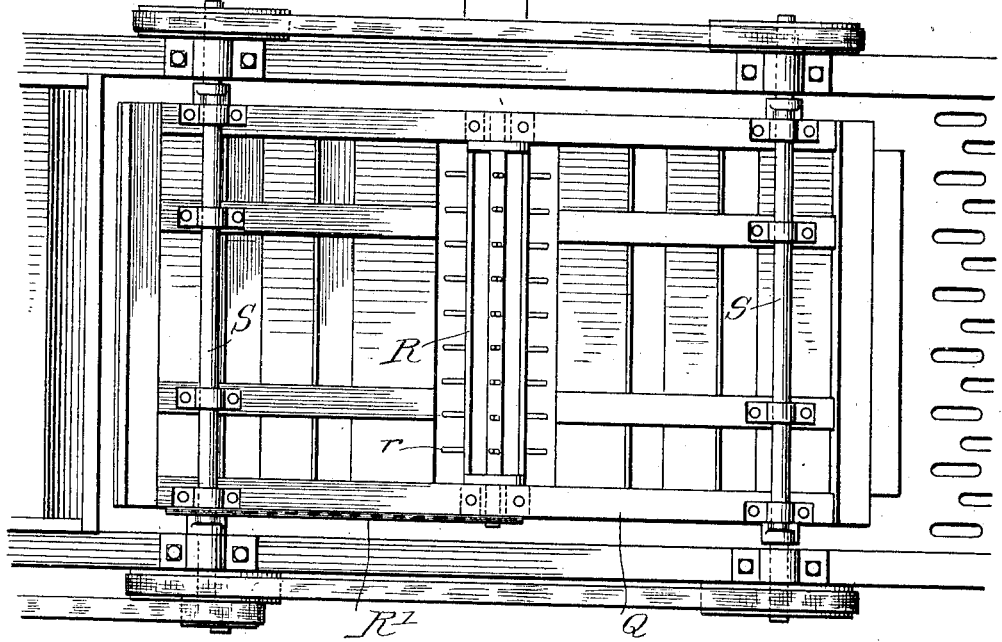
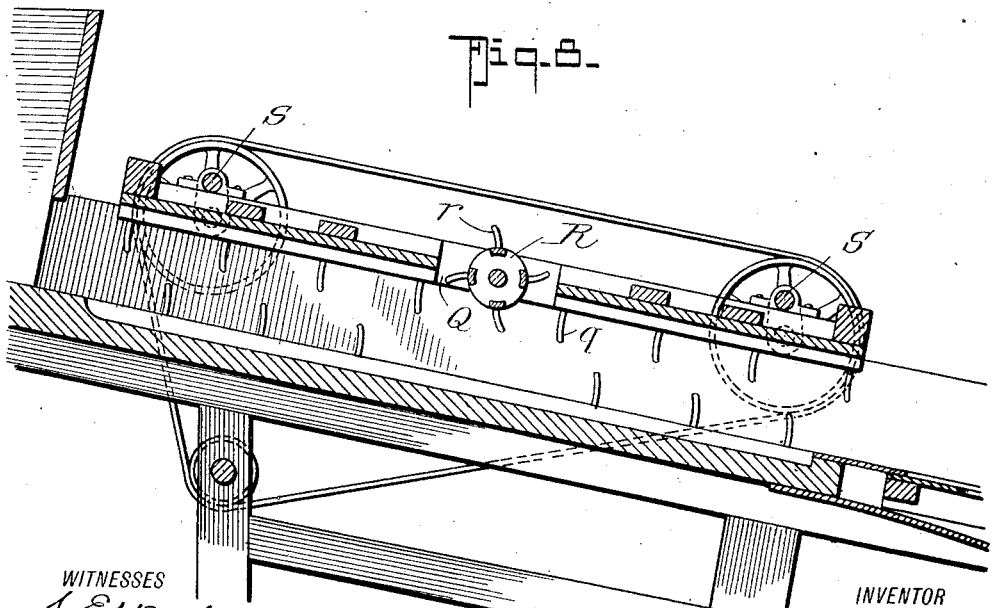
WITNESSES
INVENTOR
George W. Carpenter
BY
ATTORNEYS

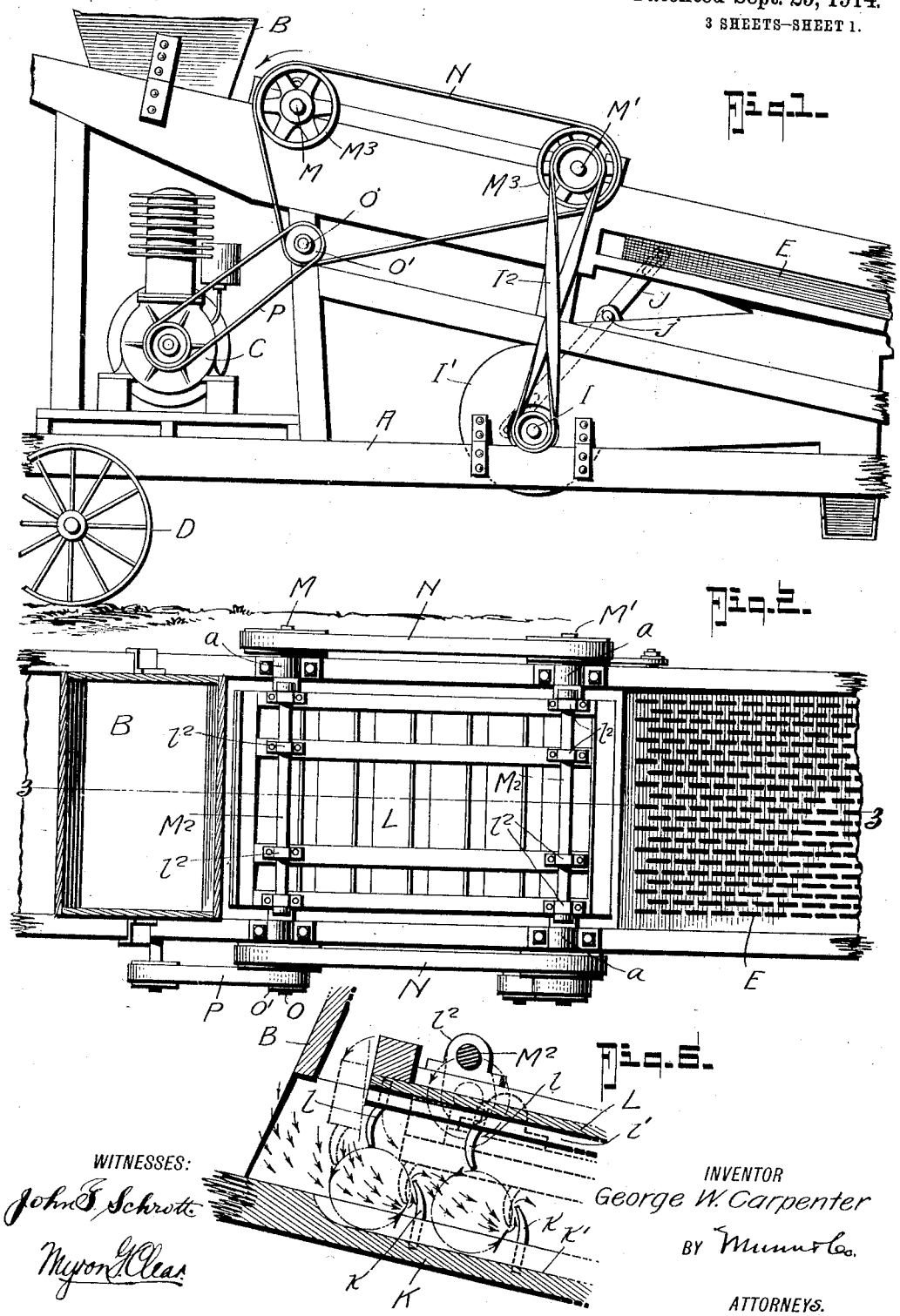

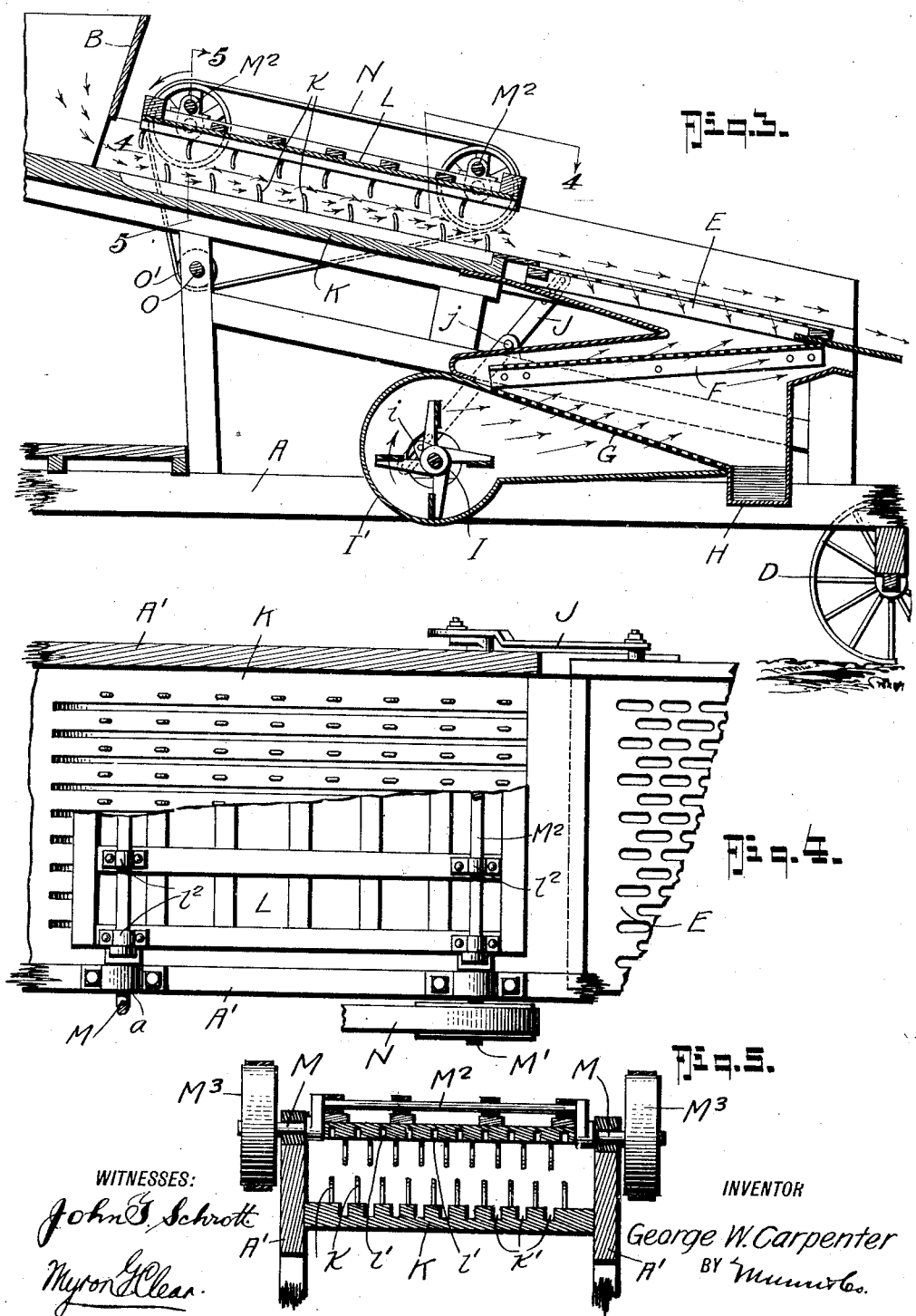

UNITED STATES PATENT OFFICE.

GEORGE WILLIAM CARPENTER, OF DEMING, NEW MEXICO, ASSIGNOR OF ONE-FOURTH TO JOHN CARPENTER, ONE-FOURTH TO H. GRANVILLE BUSH, AND ONE-FOURTH TO WILLARD E. HOLT, ALL OF DEMING, NEW MEXICO.

THRESHER.

1,112,194.  Specification of Letters Patent.  Patented Sept. 29, 1914.

Application filed April 8, 1914. Serial No. 830,365.

*To all whom it may concern:*

Be it known that I, GEORGE W. CARPENTER, a citizen of the United States, and a resident of Deming, in the county of Luna and State of New Mexico, have invented an Improvement in Threshers, of which the following is a specification.

My present invention relates to threshing machines for threshing out peas, beans and various grains, my object being to provide a new and improved machine for beating out and separating the grain, and at the same time feeding the straw through the machine, the structure and arrangement being such as that it may be operated with greatly reduced power compared to that necessary in connection with the threshing machines now in general use.

In carrying out my invention I employ the structure and arrangemnt as shown in the accompanying drawings, forming a part of this specification, and in which—

Figure 1 is a side elevation of a threshing machine constructed in accordance with my invention the extreme rear and forward portions thereof being broken away. Fig. 2 is a top plan view of the parts shown in Fig. 1. Fig. 3 is a vertical longitudinal section taken substantially on line 3—3 of Fig. 2. Fig. 4 is a detail horizontal section taken substantially on line 4—4 of Fig. 3. Fig. 5 is a detail vertical transverse section taken substantially on line 5—5 of Fig. 3. Fig. 6 is an enlarged detail section through the upper portion of the thresher plate and the beater, illustrating in detail the relative movements of the latter. Fig. 7 is a plan of a modified form of beater, and Fig. 8 is a vertical longitudinal section through the parts shown in Fig. 7.

Referring now to Figs. 1 to 7, my improvements are preferably installed in connection with a threshing machine consisting of a frame A having a rearwardly and downwardly inclined upper portion at the upper end of which is the hopper B. Material is fed downwardly from the hopper along the downwardly and rearwardly inclined plane of the upper portion of the frame just mentioned.

The lower horizontal portion of the frame A forms a support for the source of power C which may be in the nature of an internal combustion engine as shown mounted in the forward portion of the frame beneath the upper end of the upper inclined plane thereof. The entire frame is in turn supported upon wheels D and may be readily transported from place to place and easily and quickly set up for operation in a desired locality.

The lower portion of the upper inclined plane of the frame preferably consists of a correspondingly inclined and longitudinally shiftable screen E onto which the separated grain and straw are discharged, the straw passing onwardly and downwardly over the screen and the grain dropping through the screen onto a stationary inclined screen F secured therebeneath through which the grain also drops onto a third screen of a mesh sufficiently fine to prevent the grain from dropping therethrough. The grain rolls down the screen G which is also inclined and into the grain channel H. Thus the arrangement of the several screens is such that the grain in passing therethrough is subjected at all times to the action of a draft created by a rotating fan I disposed within a casing I' and having its shaft provided with a crank $i$, the crank pin of which is extended through a slot in the lower end of a lever J intermediately pivoted at $j$ and the upper slotted end of which is engaged with a pin projecting from one side of the shiftable screen E as shown in Figs. 1 and 3, whereby to transmit a longitudinal shaking movement to the screen for the purpose of permitting the grains to freely drop thereon and therethrough.

In accordance with my invention the upper portion of the upper inclined plane of the frame is in the form of a threshing plate K having upwardly projecting spurs or spikes $k$ arranged in longitudinal and transverse rows as best seen in Fig. 4 and curved slightly toward the upper end of the plate as best seen in Fig. 6, the several longitudinal rows of these spikes or spurs being separated by parallel longitudinal grooves $k'$ provided in the upper surface of the plate for a purpose to be hereinafter described.

Above the thresher plate K is disposed a beater in the form of a plate L having depending spurs or spikes $l$ arranged in longitudinal and transverse rows each longitudinal row of which is between two longitudinal rows of the spikes $k$ of the thresher plate K as clearly seen in Fig. 5, the spurs or spikes $l$ of the beater being curved toward the lower end of the thresher plate K and being thus presented oppositely with respect to the spikes or spurs $k$.

Mounted through the upper portions of the sides A′ of the frame are a pair of parallel transverse shafts M and M′ respectively located adjacent the upper and lower ends of the beater L, these shafts being journaled in bearings $a$ on the said frame side walls and having crank portions $M^2$ between the side walls, these portions $M^2$ being extended through bearings $l^2$ upon the upper surface of the beater L. Thus the shafts M and M′ being parallel to one another and their crank portions $M^2$ being of equal extension, the movement of the beater L will be even and regular throughout its length as compared to the thresher plate K and will be such as to cause the points of the spurs or projections $l$ to describe regular and complete circles between the spurs $k$. By reference to Fig. 5 it will be noted that the lower surface of the beater L is provided with longitudinal grooves $l'$ between the longitudinal rows of spikes or spurs $l$ so as to provide for the reception of the ends of the spurs or spikes $k$ when the beater is moved toward the thresher plate and the spurs or spikes $l$ enter the longitudinal grooves $k'$ of the latter.

The shafts M and M′ are provided with pulleys $M^3$ connected, at opposite sides of the frame, by belts N extending downwardly and around pulleys O′ mounted upon an intermediate shaft O being connected to the shaft of the motor by a belt P. In this manner rotation is transmitted to the shafts M and M′ and from the latter to the fan I through a connecting belt $I^2$, causing simultaneous action of the parts just described and resulting in a regular and even movement of the beater in relation to the thresher plate as just mentioned, the result of which is to continuously feed or pull the grain from the hopper B.

It will be noted that during the operation every portion of the beater L is continuously moved in a true circle so as to effectively combine the feeding operation with the beating or pounding of the grain and to permit both of these operations to be effectively accomplished without clogging the spurs or spikes so as to interfere with their free relative movement into and out of the grooves of the beater and thresher plate as before mentioned and the circular movements of their ends which each transverse roll of spurs $l$ has in advance of the corresponding roll of spurs $k$ as best shown in Fig. 5.

A threshing machine so constructed effectively performs the functions assigned thereto, is comparatively light and may be readily transported from one locality to another and just as readily set up for operation, and is capable of such operation through the use of greatly reduced power as compared to that required for the operation of threshing machines now in general use. I may, however, modify the construction of the beater by providing one as indicated at Q in the modified form Figs. 7 and 8 which is a substantial duplicate of the beater L previously described except that it is provided with a central transverse cut out portion in which is mounted a transverse threshing cylinder R having its end trunnions journaled in bearings in the side portions of the beater and having one of these trunnions extended and provided with a sprocket wheel connected by a sprocket chain R to the crank portion of one of the crank shafts S. In this manner the threshing cylinder R which has rows of spurs or spikes $r$ corresponding to those spurs or spikes $q$ of the beater, is independently rotated during circular movement of the beater and at the same time it revolves with the beater in the movement of the latter.

I claim:—

1. A threshing machine including an inclined thresher plate provided with upwardly projecting spurs or spikes, a hopper mounted adjacent the upper end of said thresher plate, a beater consisting of a plate disposed above the thresher plate and provided with depending spurs or spikes, means for imparting a circular movement to the beater and toward and away from the thresher plate and maintaining them in parallel relation at all times during the movement and a threshing cylinder mounted in and movable with the beater.

2. A threshing machine including an inclined stationary thresher plate having upwardly projecting teeth arranged in longitudinal rows and provided with longitudinal grooves between the rows, a hopper at the upper end of the said plate, a beater disposed above the thresher plate and provided with depending spurs or spikes arranged in longitudinal rows between the longitudinal rows of the thresher plate spikes and also having longitudinal grooves between its longitudinal rows of spikes or spurs, and means for imparting a circular movement to the said beater and toward and away from the thresher plate to such an extent as to cause movement of the spikes or spurs within and out of the grooves of the beater and thresher plates substantially as described.

3. A threshing machine including a frame, an inclined thresher plate mounted in the upper portion of the frame, a hopper at the upper end of the thresher plate, a beater consisting of a plate disposed above and parallel with the thresher plate, transverse shafts mounted in bearings on the frame sides and having crank portions therebetween, bearings carried by the beater plate adjacent its ends and through which the crank portions of the said shafts are journaled, the said beater plate having an intermediate transverse opening, a threshing cylinder extending within the opening of the beater plate and journaled upon the same and having a sprocket and chain connection with the crank portion of one of the said shafts, and means for rotating the shafts whereby to impart a circular movement to the beater plate and the cylinder and independently rotate the latter during such movement, all for the purpose described.

4. A threshing machine including an inclined thresher plate provided with upwardly projecting spurs or spikes, a hopper mounted adjacent the upper end of said thresher plate, a beater consisting of a plate disposed above the thresher plate and provided with depending spurs or spikes, a threshing cylinder mounted transversely across and within the beater plate and provided with peripherally projecting spurs or spikes, and means for imparting a circular movement to the beater and its cylinder toward and away from the thresher plate and maintaining them in parallel relation at all times, and means whereby to impart independent rotative movement to the cylinder during its movement with the beater.

GEORGE WILLIAM CARPENTER.

Witnesses:
WILLARD E. HOLT,
LEE O. LESTER.

---

Copies of this patent may be obtained for five cents each, by addressing the "Commissioner of Patents, Washington, D. C."